Figure 1:
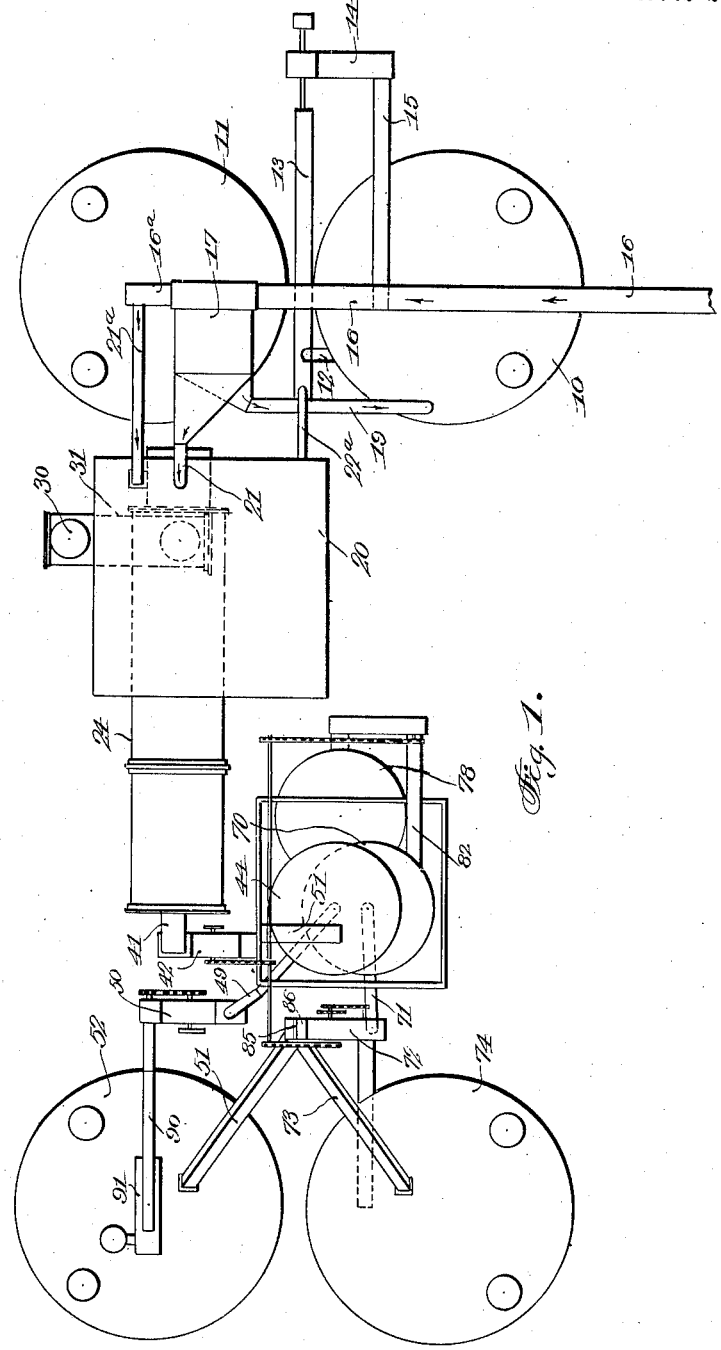

April 10, 1934.  W. J. KUNTZ  1,954,211
PROCESS FOR TREATING LIME
Filed May 2, 1928   4 Sheets-Sheet 1

INVENTOR
W. J. KUNTZ
BY
ATTORNEYS

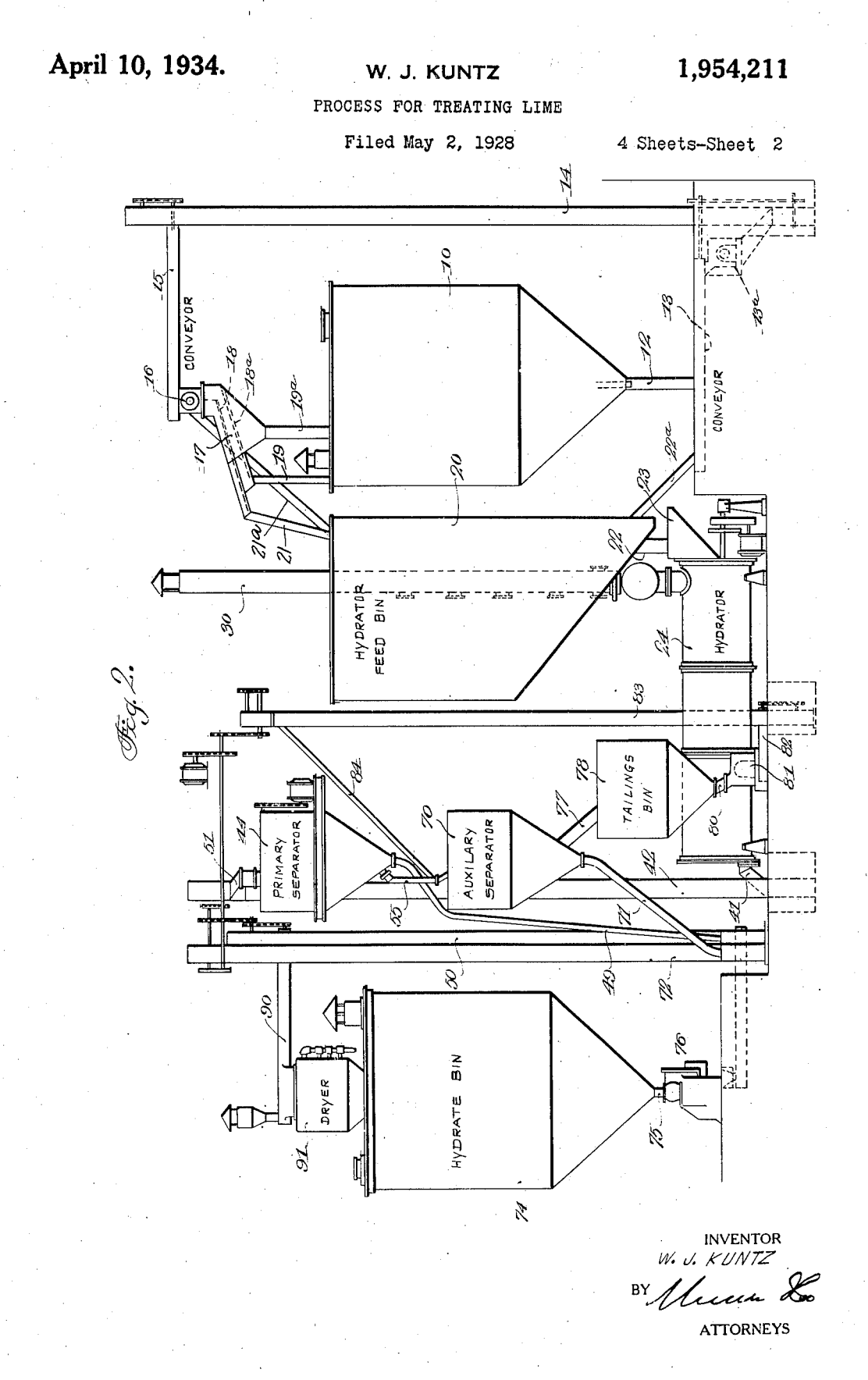

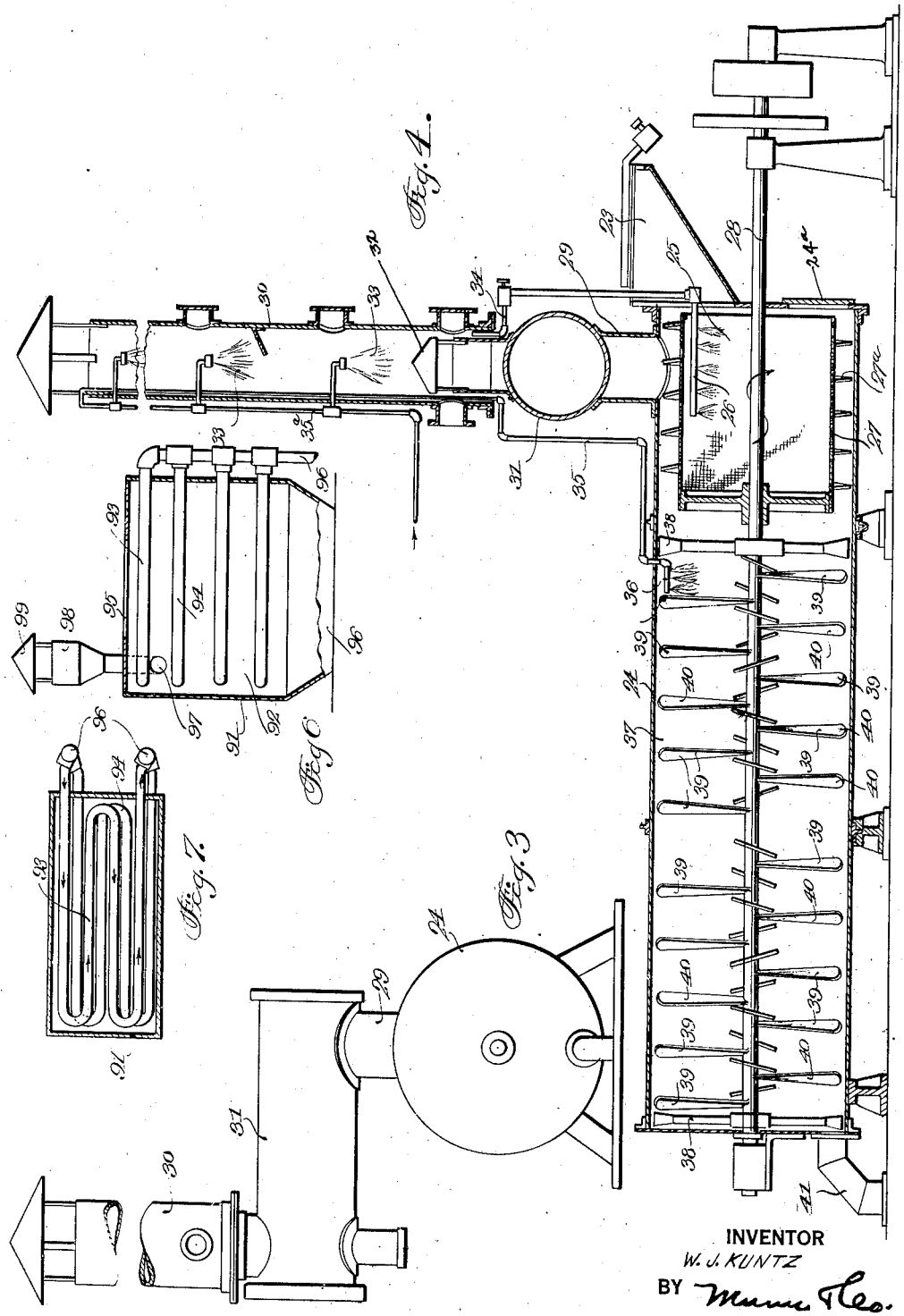

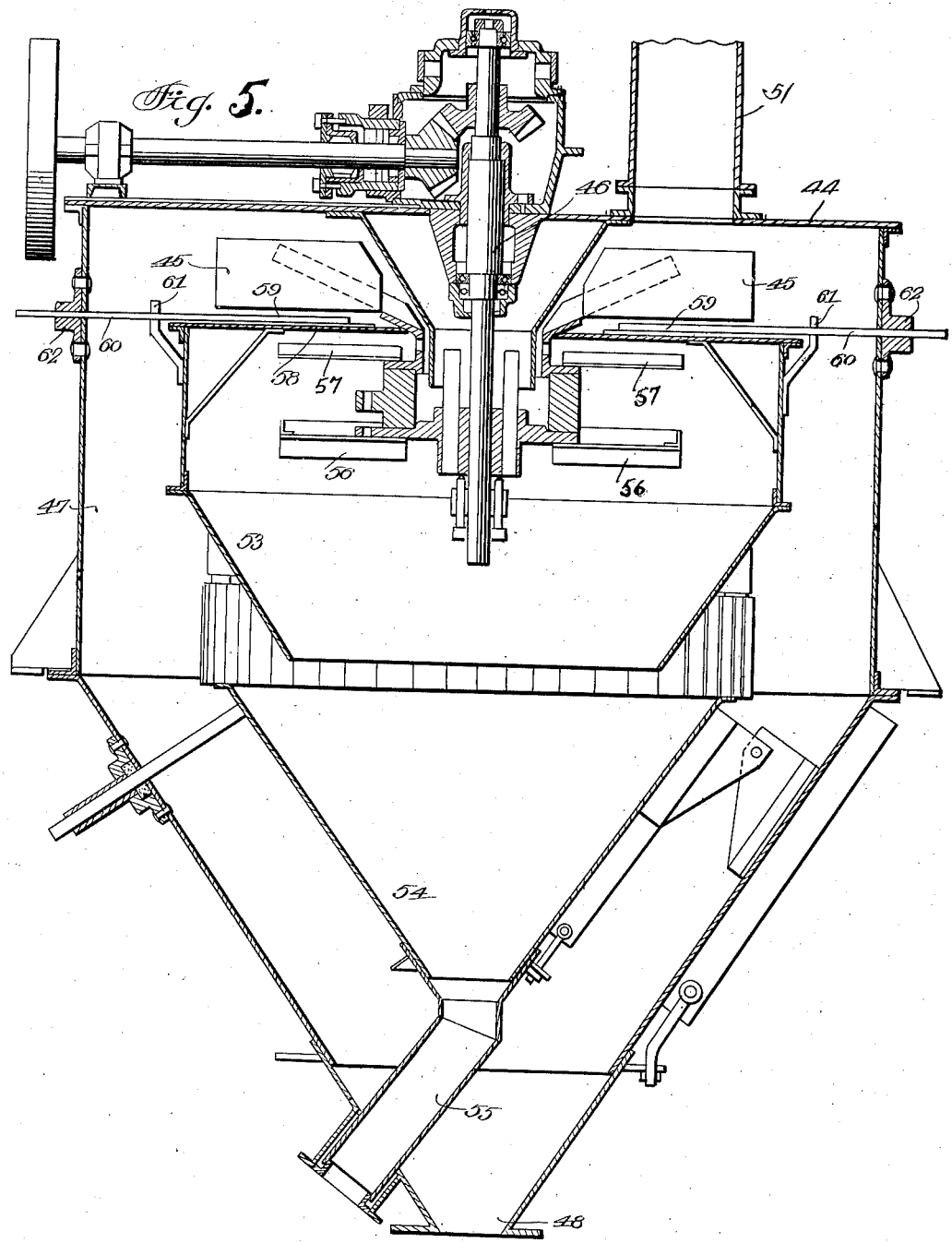

Patented Apr. 10, 1934

1,954,211

UNITED STATES PATENT OFFICE 1,954,211

PROCESS FOR TREATING LIME

William J. Kuntz, York, Pa.

Application May 2, 1928, Serial No. 274,589

20 Claims. (Cl. 23—188)

This invention relates to a process for treating lime.

An object of the invention is the provision of a process for hydrating and classifying lime by which the lime as it comes from the kilns is broken down naturally by water, the water being heated in consequence is employed for treating an additional quantity of lime.

Another object of the invention is the provision of a process for breaking up lime directly from a kiln, or raw lime, by means of water, the heated water containing lime being employed for breaking up fresh quantities of kiln lime in a hydrator in which the steam generated rushes into the treatment zone of the hydrator and is condensed, thus supplying the lime with further moisture under a vacuum.

A further object of this invention is to combine the grading of the lime, both hydrated and unhydrated, with the hydrating process in such manner as to automatically separate out various grades of commercial lime and to work over material not entirely suitable for commercial uses until it becomes suitable, rejecting the unsuitable material.

A further object of the invention is the provision of a process for treating lime in which the lime direct from a kiln or raw lime, is broken down with water after which the hydrated lime is aerated and dried and separated in the various stages of selection into grades.

This invention will be best understood from a consideration of the following detailed description in connection with the accompanying drawings; nevertheless, it is to be understood that the invention is not confined to the disclosure being susceptible of such changes and modification as shall define no material departure from the salient features of the invention as expressed in the appended claims.

In the drawings:—

Figure 1 is a plan view of an arrangement for treating lime shown more or less diagrammatically, Figure 2 is a side view in elevation of the same, Figure 3 is an end view of the hydrating device, Figure 4 is a longitudinal vertical section of the hydrator shown in Figure 3, Figure 5 is a vertical section of the combined centrifugal separator and aerating device, Figure 6 is a vertical section of a drier employed in connection with the arrangement, Figure 7 is a horizontal section of the same.

Referring more particularly to the drawings, 10 designates a storage bin for pebble lime closely associated with a storage bin 11 for ground lime. The lower end of the bin 10 is provided with a discharge pipe 12 for conducting material from said bin into the conveyor 13 which is deposited in an elevator 14 and carried upwardly to a conveyor 15 to a third conveyor 16 which deposits the material on hummer screen 17, when desired.

The hummer screen consists of several perforate members 18 and 18ª which are agitated. The heavier particles which fail to pass screen 18 are carried by pipe 21 to the hydrator feed bin 20. The particles which pass screen 18 but fail to pass screen 18ª are conducted by pipe 19 to the bin 10. The fine materials which have passed both screens 18 and 18ª are conducted into the tank 11 by a pipe 19ª. The travelling carrier 16 brings the materials from a point where the lime is stored after being brought from the source of supply.

Either one of the screens 18 or 18ª can be dispensed with so that only one separation of the lime into lighter and heavier particles will take place. In such case, the heavier particles would be carried from above the screen out to the hydrator feed bin while the finer particles passing through the screen would be conducted to either tank 10 or tank 11.

A hydrator feed bin 20 is located adjacent the bins 10 and 11 and may be directly supplied through a pipe with the lime which comes from a kiln. The direct supply of lime in this case passes the hummer screen by means of an extension 16ª of the conveyor 16 and is conducted to the tank 20 by a pipe 21ª. The lower end of the hydrator bin is provided with a rotary feeder 22 in communication with a hopper 23 of a hydrator 24. A chute 22ª is adapted to be placed in communication with the travelling carrier 13 whereby the materials from the bin 20 are conducted through the beater mill for removing fines from the coarse materials before the materials are again placed on the hummer screen.

The hydrator has a compartment 25 into which the hopper 23 deposits the materials, such as calcium oxide. Water from a main sprinkler 26 is sprayed on to the lime in this compartment which is defined by means of a screen 27 revolved by a shaft 28. In this compartment the lime is broken down as it is admitted into the hydrator with the formation of steam which becomes laden with a considerable quantity of lime. This lime-laden steam passes through a vertical conduit 29 and into a condenser 30. A horizontal conduit 31 connects the condenser 30 with the conduit 29. A spiral blade 27ª is secured to the outer face of the screen 27. A door 24ª closes an opening at the feeding end of the hydrator and through which opening the cores and unburned materials are removed from the compartment 25.

As the lime-laden steam passes up through the condenser 30 it is engaged by a baffle 32 for aiding in retarding the rate of speed of the flow of the steam to cause said steam to give up its lime. In addition to the baffling to remove the lime, sprays 33 are employed for discharging a predetermined quantity of water onto the up stream of lime-laden steam, which will condense the steam and eliminate any discharge of lime from the condenser. The sprinklers 33 are spaced apart at equal distances or approximately so. The water from the condenser containing the lime falls to the bottom and is then carried back to the breaking down chamber 25 through a pipe 34 which is in communication with the spray pipe 26. A pipe 35 is connected to the supply pipe 35ª with a spraying device 36 located directly at the outer end of the chamber 25 and in a chamber 37 which forms the treatment zone of the hydrator. The spraying device 26 it will be noted, supplies the hydrator with water from the condenser 30 and since this water is passed through a heated space and in contact with the hot steam, said water is heated which will facilitate the rapid formation of the hydrate in the hydrator. The pipe 35 is located in the condenser so that it will absorb heat. Thus the water which is passed through the auxiliary sprinkler 36 is heated before entering the treatment zone. The shaft 28 extends entirely through the hydrator 24 and is provided with a plurality of vanes or stirrers 38, 39 and 40 which are adapted to thoroughly agitate the lime as it passes through the treatment zone. The hydrate is then discharged through a pipe 41 on to an elevator 42.

Stirrers 38 are in a plane which passes through the axis of the shaft 28 and merely turn the material over in the treatment zone of the hydrator. Stirrers 39 always move the materials forwardly toward the discharge end of the hydrator while stirrers 40 reverse the direction of movement of the materials. However, since a greater number of the forward stirrers 39 are employed, the materials are advanced progressively from the feeding end to the discharge end of the hydrator.

It will be seen by the particular treatment of the calcium hydroxide in the hydrator that the lime is supplied with a predetermined quantity of water which is effective for the purpose, at a temperature which will more readily increase the production of the hydrate. Furthermore, the heated water which is supplied to the hydrator contains a considerable quantity of lime in the form usually known as milk of lime which has been conserved by the removal of the lime from the steam which ordinarily is permitted to escape to the atmosphere. Due to the fact that a considerable quantity of steam is provided when the calcium oxide comes in contact with the water some of this steam will tend to escape through the condenser 30, while the remaining portion will pass into the treatment zone 37 where it is condensed and where it supplies the lime with the proper quantity of moisture.

The calcium hydroxide from the hydrator 24 is carried through a conduit 41 to the elevator 42 which deposits the lime into a chute 51 discharging to a selector and aerator designated by the numeral 44. As shown more particularly in Figure 5 the calcium hydroxide is discharged upon the blades 45 which are revolved through a shaft 46. These revolving blades not only act as a centrifugal selector for the incoming stream of the hydrate, but draw in air which is thoroughly mixed with the hydrate for aiding in drying or reducing the moisture content of the hydrate. The fine particles are thrown outwardly and pass downwardly through the annular section 47 of the member 44 and are discharged through the lower conically shaped end 48, whence the fine particles are conducted by a pipe 49 to an elevator 50 which discharge the fine particles onto the conveyor 90 where after passing through a dryer, the particles are deposited into the storage bin 52.

The heavier particles pass downwardly through the central chamber 53 through the stream of the fine particles whence they are deposited in a conically shaped hopper 54 and carried from said hopper by means of a discharge pipe 55. The revolving blades 56 and 57 tend to agitate the heavier particles, while aerating said particles by means of the air drawn through the passages 58 in the upper end of the conically shaped member 53. These air passages are controlled by means of valves 59 operated through rods 60 which are journaled in bearings 61 and 62.

The heavier particles which have taken a separate path from the fine particles are conducted by the pipe 55 into the top of a secondary selector and aerator 70. This selector has a construction which is similar to the construction shown in Figure 5, and in which the heavier particles are again graded and treated with air so that the finer particles from this grading will take an outward course and be conducted by the pipe 71 to an elevator 72 to an elevated point, whence they are carried by means of the conduit 73 to the hydrate storage bin 74 or 52 as the case may be. The lower end of each bin 52 or 74 is provided with the usual discharge member 75 equipped with a device 76 for supplying bags with the material in predetermined quantities.

The heavier materials are conducted by a pipe 77 from the separator and discharged into a tailings bin 78.

The materials which enter the tailings bin 78 consists of cores, unburned lime and foreign matter which are covered with fines of the hydrated lime. It is very desirable that these fines be removed from the cores and unburned lime and, therefore, the same is passed through a chute 80 to a beater mill 81 which is described and claimed in my Patent No. 1,742,511. This beater mill violently agitates the materials recovering the fines which are carried by a conveyor 82 to an elevator 83 and then conducted by a pipe 84 to the pipe 49 connected with the pipe 55, and conducted to the auxiliary separator 70. These fines, together with the fines produced in the separator 70 are conducted by pipe 71 to the elevator 72 after which they are deposited in the container 52. A gate valve 85 is employed in the housing 86 at the upper end of the elevator and is adapted to control the flow of materials to both of the containers 52 and 74 or to the container 52 alone. The cores or unburned materials are ejected from the beater mill 81.

Before the materials are placed in the hydrator bin 52 by the conveyor 90, they are passed through a dryer 91 located in the top of the hydrator bin 52 or 74. This dryer consists of a chamber 92 in which are located a plurality of coils of pipes 93 and 94 disposed in various horizontal planes with alternate rows of the pipes being located in staggered relation to the adjacent rows, so that as the lime enters the opening 95 it will fall on the series of pipes and be heated by the pipes through which steam is passed from a pipe 96. The lower end of the chamber 92 is restricted and provided with an opening 96 through which the dried lime passes for entering the hydrator bins. As the lime falls upon the pipes 93 and 94 it will collect thereon and when sufficiently dried will fall by gravity through the opening 96 and into the bin.

The lime which enters the bins contains less than one-half of one per cent of moisture. Steam which is caused by evaporation of the moisture in the lime enters the passage 97 through the small tower 98 and strikes against the cap 99 before it passes out from under the cap to the atmosphere. This baffling of the steam will cause any lime carried by the steam to be precipitated and discharged back into the chamber 92.

By this arrangement it will be seen that a very fine quality of lime is produced and that at no time is any of the lime carried out of the various elements to the atmosphere, and this lime when bagged is in a state for immediate use.

I claim:—

1. In the method of treating lime, the steps comprising hydrating the lime to form calcium hydroxide, separating the calcium hydroxide into lighter and heavier particles, conveying the lighter particles to a point of delivery, milling the heavier particles, separating the milled particles into lighter and heavier particles and conveying the lighter particles to a point of delivery.

2. In the method of treating lime, the steps comprising hydrating the lime to form calcium hydroxide, separating the calcium hydroxide into lighter and heavier particles, drying the lighter particles and conveying them to a point of delivery, milling the heavier particles, separating the milled particles into lighter and heavier particles and conveying the lighter particles to a point of delivery.

3. In the method of treating lime, the steps comprising hydrating the lime to form calcium hydroxide, separating the calcium hydroxide into lighter and heavier particles, conveying the lighter particles to a point of delivery, further separating the heavier particles into lighter and heavier particles, conveying the lighter particles to a point of delivery, milling the heavier particles, separating the milled material into lighter and heavier particles and conveying the lighter particles to a point of delivery.

4. In the method of treating lime, the steps comprising hydrating the lime to form calcium hydroxide, separating the calcium hydroxide into lighter and heavier particles, drying the lighter particles and conveying them to a point of delivery, further separating the heavier particles into lighter and heavier particles, conveying the lighter particles to a point of delivery, milling the heavier particles, separating the milled material into lighter and heavier particles and conveying the lighter particles to a point of delivery.

5. In the method of treating lime, the steps comprising hydrating the lime to form calcium hydroxide, separating the calcium hydroxide into lighter and heavier particles and at the same time passing a drying fluid through the particles, conveying the lighter particles to a point of delivery, milling the heavier particles, separating the milled particles into lighter and heavier particles and conveying the lighter particles to a point of delivery.

6. In the method of treating lime, the steps comprising hydrating the lime to form calcium hydroxide, separating the calcium hydroxide into lighter and heavier particles and at the same time passing a drying fluid through the particles, conveying the lighter particles to a point of delivery, milling the heavier particles, separating the milled particles into lighter and heavier particles and at the same time passing a drying fluid through the particles and conveying the lighter particles to a point of delivery.

7. In the method of treating lime, the steps comprising hydrating the lime to form calcium hydroxide, separating the calcium hydroxide into lighter and heavier particles and at the same time passing a drying fluid through the particles, conveying the lighter particles to a point of delivery, further separating the heavier particles into lighter and heavier particles and at the same time passing a drying fluid through the particles, conveying the lighter particles to a point of delivery, milling the heavier particles, separating the milled material into lighter and heavier particles and at the same time passing a drying fluid through the particles and conveying the lighter particles to a point of delivery.

8. In the method of treating lime, the steps comprising hydrating the lime to form calcium hydroxide, separating the calcium hydroxide into lighter and heavier particles, collecting the lighter particles, milling the heavier particles to break up the calcium hydroxide, separating the milled material into lighter and heavier particles and collecting the lighter particles.

9. In the method of treating lime, the steps comprising separating the lime into lighter and heavier particles, collecting the lighter particles, hydrating the heavier particles to form calcium hydroxide, separating the calcium hydroxide into lighter and heavier particles, milling the heavier particles, separating the milled particles into lighter and heavier particles and collecting the lighter particles.

10. In the method of treating lime, the steps comprising separating the lime into lighter and heavier particles, collecting the lighter particles, separating said heavier particles into lighter and heavier particles, collecting the lighter particles, hydrating the heavier particles to form calcium hydroxide, separating the calcium hydroxide into lighter and heavier particles, collecting the lighter particles, milling the heavier particles, separating the milled particles into lighter and heavier particles and collecting the lighter particles.

11. In the method of treating lime, the steps comprising separating the lime into lighter and heavier particles, collecting the heavier particles, separating the lighter particles into lighter and heavier particles, collecting the particles, hydrating the first-mentioned heavier particles, and separating the hydrated material into lighter and heavier particles.

12. In the method of treating lime, the steps comprising separating the lime into lighter and heavier particles, milling the heavier particles, separating the milled material into lighter and heavier particles, hydrating the heavier particles to form calcium hydroxide, separating the calcium hydroxide into lighter and heavier particles, collecting the lighter particles, milling the heavier particles to break up the calcium hydroxide, separating the milled particles into lighter and heavier particles, and collecting the lighter particles.

13. In the method of treating lime, the steps comprising separating the lime into lighter and heavier particles, collecting the heavier particles, separating the lighter particles into lighter and heavier particles, collecting the particles, milling the first-mentioned heavier particles, separating the milled material into lighter and heavier particles, hydrating the heavier particles to form calcium hydroxide, separating the calcium hydroxide into lighter and heavier particles, collecting the lighter particles, milling the heavier particles, separating the milled material into lighter and heavier particles, and collecting the lighter particles.

14. In the method of treating lime, the steps comprising separating the lime into lighter and heavier particles, hydrating the heavier particles to form calcium hydroxide, separating the calcium hydroxide into lighter and heavier particles, conveying the lighter particles to a point of delivery, milling the heavier particles, separating the milled material into lighter and heavier particles, and conveying the lighter particles to a point of delivery.

15. In the method of treating lime, the steps comprising separating the lime into lighter and heavier particles, collecting the heavier particles, separating the lighter particles into further lighter and heavier particles, collecting and storing the last mentioned lighter and heavier particles, hydrating the first mentioned heavier particles to form calcium hydroxide, separating the calcium hydroxide into lighter and heavier particles, collecting the lighter particles, milling the heavier particles, separating the milled material into lighter and heavier particles, and collecting the lighter particles.

16. In the method of treating lime, the steps comprising separating the lime into lighter and heavier particles, collecting the heavier particles, separating the lighter particles into further lighter and heavier particles, collecting and storing the last mentioned lighter and heavier particles, hydrating the first mentioned heavier particles to form calcium hydroxide, separating the calcium hydroxide into lighter and heavier particles, collecting the lighter particles, further separating the heavier particles into lighter and heavier particles, collecting the lighter particles, milling the heavier particles, separating the milled material into lighter and heavier particles, and collecting the lighter particles.

17. In the method of treating lime, the steps comprising hydrating the lime to form calcium hydroxide, separating the calcium hydroxide into lighter and heavier particles in separating apparatus, collecting the lighter particles, milling the heavier particles, separating the milled material into lighter and heavier particles in the aforesaid separating apparatus, and collecting the lighter particles.

18. In the method of treating lime, the steps comprising hydrating the lime to form calcium hydroxide, separating the calcium hydroxide into lighter and heavier particles in separating apparatus, collecting the lighter particles, passing the heavier particles to other separating apparatus, separating them into lighter and heavier particles, collecting the lighter particles, milling the heavier particles, separating the milled material into lighter and heavier particles in the last mentioned separating apparatus, and collecting the lighter particles.

19. In the method of treating lime, the steps comprising separating the lime into lighter and heavier particles, separately collecting the particles, hydrating the heavier particles to form calcium hydroxide, separating the calcium hydroxide into lighter and heavier particles in separating apparatus, collecting the lighter particles, milling the heavier particles, conveying the milled material to and separating it into lighter and heavier particles in said separating apparatus, and conveying the lighter particles to a point of delivery.

20. In the method of treating lime, the steps comprising separating the lime into lighter and heavier particles, separately collecting the particles, hydrating the heavier particles to form calcium hydroxide, separating the calcium hydroxide into lighter and heavier particles in separating apparatus, collecting the lighter particles, further separating the heavier particles into lighter and heavier particles in other separating apparatus, collecting the lighter particles, milling the heavier particles, passing the milled material into and separating it into lighter and heavier particles in the last mentioned separating apparatus, and collecting the lighter particles.

WILLIAM J. KUNTZ.